United States Patent [19]
Jones

[11] Patent Number: 5,978,856
[45] Date of Patent: *Nov. 2, 1999

[54] SYSTEM AND METHOD FOR REDUCING LATENCY IN LAYERED DEVICE DRIVER ARCHITECTURES

[75] Inventor: Craig Jones, Lago Vista, Tex.

[73] Assignee: Dell USA, L.P., Round Rock, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/592,507

[22] Filed: Jan. 26, 1996

[51] Int. Cl.$^6$ .................................................. G06F 13/00
[52] U.S. Cl. .................................................. 709/301
[58] Field of Search .................................... 395/681, 670, 395/441, 651, 182.03; 711/114

[56] References Cited

U.S. PATENT DOCUMENTS

| | | | |
|---|---|---|---|
| 4,888,691 | 12/1989 | George et al. | 364/300 |
| 5,210,860 | 5/1993 | Pfeffer et al. | 395/575 |
| 5,220,653 | 6/1993 | Miro | 395/275 |
| 5,307,491 | 4/1994 | Feriozi et al. | 395/700 |
| 5,313,585 | 5/1994 | Jeffries et al. | 395/275 |
| 5,446,855 | 8/1995 | Dang et al. | 395/401 |
| 5,471,675 | 11/1995 | Zias | 395/762 |
| 5,479,653 | 12/1995 | Jones | 395/182.03 |
| 5,548,783 | 8/1996 | Jones et al. | 395/836 |
| 5,598,549 | 1/1997 | Rathunde | 395/441 |
| 5,613,123 | 3/1997 | Tsang et al. | 395/651 |
| 5,671,442 | 9/1997 | Feeney et al. | 395/834 |

*Primary Examiner*—Alvin E. Oberley
*Assistant Examiner*—Sue Lao

*Attorney, Agent, or Firm*—Skjerven, Morrill, MacPherson, Franklin & Friel, L.L.P.

[57] ABSTRACT

A system and method for reducing latency in systems using layered device driver architectures. The preferred embodiment of the invention comprises a disk subsystem including a layered device driver architecture which performs various RAID operations. A plurality of the driver layers are defined to use a common request structure. The system and method of the present invention determines if a request maps unmodified to a lower driver layer and "quick launches" these requests to the lower driver layer according to the present invention. When a host request is received, the first layer device driver executing on the disk controller determines if the enqueued request is atomic, i.e., if the request maps unmodified to the next lower level driver layer. If so, then the request is dequeued from the first level queue and enqueued on the next lower level layer queue, avoiding steps of allocating and populating a new request structure for the lower level driver. This process preferably repeats for each of the device driver layers. When the last device driver layer completes, each device driver performs a completion callback to its calling driver layer. If a respective device driver layer was quick launched from a higher level driver layer, bypassing one or more intermediate driver layers, then the respective device driver layer performs a completion callback to the higher level driver layer, also bypassing the intermediate layers. Therefore, the system and method of the present invention reduces and/or virtually eliminates added latency in layered device driver architectures for those requests which pass through one or more device driver layers unmodified.

35 Claims, 8 Drawing Sheets

SYSTEM AND METHOD FOR REDUCING LATENCY IN LAYERED DEVICE DRIVER ARCHITECTURES

FIELD OF THE INVENTION

The present invention relates to computer systems using layered device driver architectures, and more particularly to a method for eliminating added latency in layered device driver architectures where requests typically pass through one or more device driver layers unmodified.

DESCRIPTION OF THE RELATED ART

Modern computer systems require increasingly greater amounts of memory and storage capabilities. This is particularly true in network server applications where a single computer referred to as a file server stores files for a number of users in a local area network (LAN). In a typical file server, the storage needs typically exceed the capacity of current hard disks, and thus most file servers require multiple disks to provide the necessary storage capacity. A typical disk drive storage configuration uses a redundant array of inexpensive disks, referred to as a RAID configuration, whereby the drives are linked together through hardware to form a drive array. In this manner, a number of individual hard disks are combined to create a massive virtual system. The drives in the array are coordinated with each other and information is allocated between them.

In a typical RAID configuration data is split between the drives at the bit, byte or block level. For example, in a four drive system two bits of every byte might come from the first hard disk, the next two bits from the second hard disk, and so on. The four drives then output a single byte data stream four times faster than a serial drive implementation, i.e., transferring all the information comprised in a byte takes only as long as required for a single drive to transfer two bits. This technique of splitting data between several drives is referred to as data striping. Operating multiple individual disks together as an array allows for higher speeds, improved reliability, and greater resistance to errors than can be achieved by operating each disk independently.

One possible drawback to data striping is that the failure of any drive in the system results in the complete failure of the entire system. Therefore, various methods have been developed to use a portion of the capacity of the drive array to yield more reliable and fault-tolerant storage systems. This increased reliability and fault-tolerance is achieved through various redundancy measures, including mirroring and parity implementations. Currently, five levels of RAID technology are now recognized. Each of these implementations has various tradeoffs regarding efficient use of drive capacity, fewest number of drives, greatest reliability, and best performance.

RAID 1 is the simplest drive array implementation and simply comprises two equal capacity disks that mirror each other. One disk duplicates all the files of the other, essentially serving as a backup copy. RAID 2 interleaves bits or bytes of data, i.e., implements data striping as explained above, and uses one or more redundant disks to correct single bit errors and detect double bit errors. The number of extra disks required depends upon the particular error correction algorithm used. RAID 3 implements data striping and includes one or more extra drives for parity checking. It is important to note that RAID 3 only provides for parity checking and does not include any provision for error correction, i.e., errors can be detected without any guarantee of recovery. Parity checking typically requires fewer extra drives than the other RAID implementations, typically only one extra drive per array. RAID 4 interleaves sectors of data, not bits or bytes. In addition, the sectors are read serially as if the drives in the array were functionally one large drive with more heads and platters. One drive in the array is dedicated to parity checking for reliability. The RAID 4 implementation offers the advantage that operating systems can process multiple data requests simultaneously and further can receive and reorganize requests to perform them in the most efficient manner. In the RAID 5 implementation, the disk array does not include a single dedicated parity drive as in RAID 4, but rather the parity check function is rotated throughout the various drives in the array. In this manner, error checking is distributed across all of the disks in the array. RAID 4 can be considered a degenerate form of RAID 5, i.e., once disk array controller logic has been developed to implement a RAID 5 array, a RAID 4 array can be implemented by simply disabling the logic which distributes parity across the disks in the array. In addition to the five levels of RAID technology discussed above, the term "RAID 0" is often used to refer to a number of disk drives that are data striped but have no form of redundancy.

Modern disk array architectures typically use a layered device driver architecture where host data requests pass through a plurality of device driver layers in the disk array controller before the data is transferred to the host. For example, various device driver layers may perform operations such as request sorting, prioritizing, combining and redundancy management, among others. Layered device driver architectures are also used in other types of communications and storage applications. One drawback to layered device driver architectures is that each layer adds latency to a request. However, in many instances the host data request passes through the various device driver layers unmodified, and in these instances, each device driver layer adds unnecessary latency to the request. This added latency adversely affects system performance.

Applicant is aware that the Windows NT operating system includes a layered SCSI device driver module. Windows NT allocates a large amount of memory space at the beginning for each layer. Allocating a large amount of memory for all device driver layers at one time avoids the necessity of having to perform an allocation for each layer later on. However, Windows NT duplicates data structures, i.e., creates a unique request, for each layer in the stack, and performs callbacks for each layer. As mentioned above, creating a unique request and performing callbacks for each driver layer is undesirable where the request passes through the layers unmodified.

Therefore, a system and method is desired which eliminates added latency in layered device driver architectures where requests typically pass through one or more device driver layers unmodified.

SUMMARY OF THE INVENTION

The present invention comprises a system and method for reducing latency in layered device driver architectures. The preferred embodiment of the invention comprises a disk subsystem including a layered device driver architecture which performs various RAID operations. In an independent access RAID implementation, any individual disk request generally involves only one physical disk. As a result, the vast majority of requests processed by the disk controller map unmodified between one or more layers of drivers. The system and method of the present invention determines if a request maps unmodified to a lower driver layer and "quick launches" these requests to the lower driver layer according to the present invention.

In the layered device driver architecture of the present invention, a plurality of layers of the stack where quick launching is performed are defined to use a common request structure. In the disk subsystem of the preferred embodiment, the device driver architecture comprises a host interface layer, a composite layer, a redundancy layer, a guarded layer, and a physical layer. These layers interface between the host interface and the disk array hardware. In the preferred embodiment, all layers except the physical layer share a common request structure.

When a host request is received, the request is populated and enqueued on the first level queue. The first layer device driver executing on the disk controller then determines if the enqueued request is atomic, i.e., if the request maps unmodified to the next lower level driver layer. If not, then the disk controller manipulates the request into one or more atomic requests, allocates the requests, and populates the requests for the next driver layer. These requests are enqueued on a queue of the next lower level device driver, and this lower level device driver is launched.

If the first level request maps unmodified to the next lower level driver layer, then the request is "quick launched", i.e., dequeued from the first level queue and immediately enqueued on the next lower level queue. Therefore, steps of manipulating the request, allocating the request and populating the request for the next lowest level queue are avoided. The next lower level device driver is then launched on this request. The next lower level device driver launched on the request performs similar steps, i.e., determines if the enqueued request is atomic and, if so, quick launches the request on the next lower driver layer. This process preferably repeats for each of the device driver layers where quick launching is possible.

When the last device driver layer completes, each device driver performs a completion callback to its calling driver layer. If a respective device driver layer was quick launched from a higher level driver layer, bypassing one or more intermediate driver layers, then the respective device driver layer performs a completion callback directly to the higher level driver layer, also bypassing the intermediate layers.

According to the preferred embodiment, the disk controller sets a flag when a quick launch is performed. During the completion callback, the callback function for each layer examines its respective flag and updates a queue depth variable as well as other information if a quick launch was performed. In addition, starting sector numbers of disk requests are presumed to change as the request propagates through the various software driver layers. Therefore, when a quick launch is performed according to the present invention and a sector is translated, the sector displacement is added to a running offset field. According to the preferred embodiment, the callback function corrects the starting sector number and error sector numbers. Upon completion of each of the device driver layers, when the completion callback is performed, the offset field is subtracted from the starting and error sector numbers to restore the original value.

Therefore, the system and method of the present invention reduces and/or virtually eliminates added latency in layered device driver architectures for those requests which pass through all device driver layers unmodified. The present invention thus provides increased performance over prior art methods.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

U.S. Pat. No. 5,313,626 titled "Disk Drive Array with Efficient Background Rebuilding" is hereby incorporated by reference in its entirety.

Computer System Block Diagram

Figure 1:
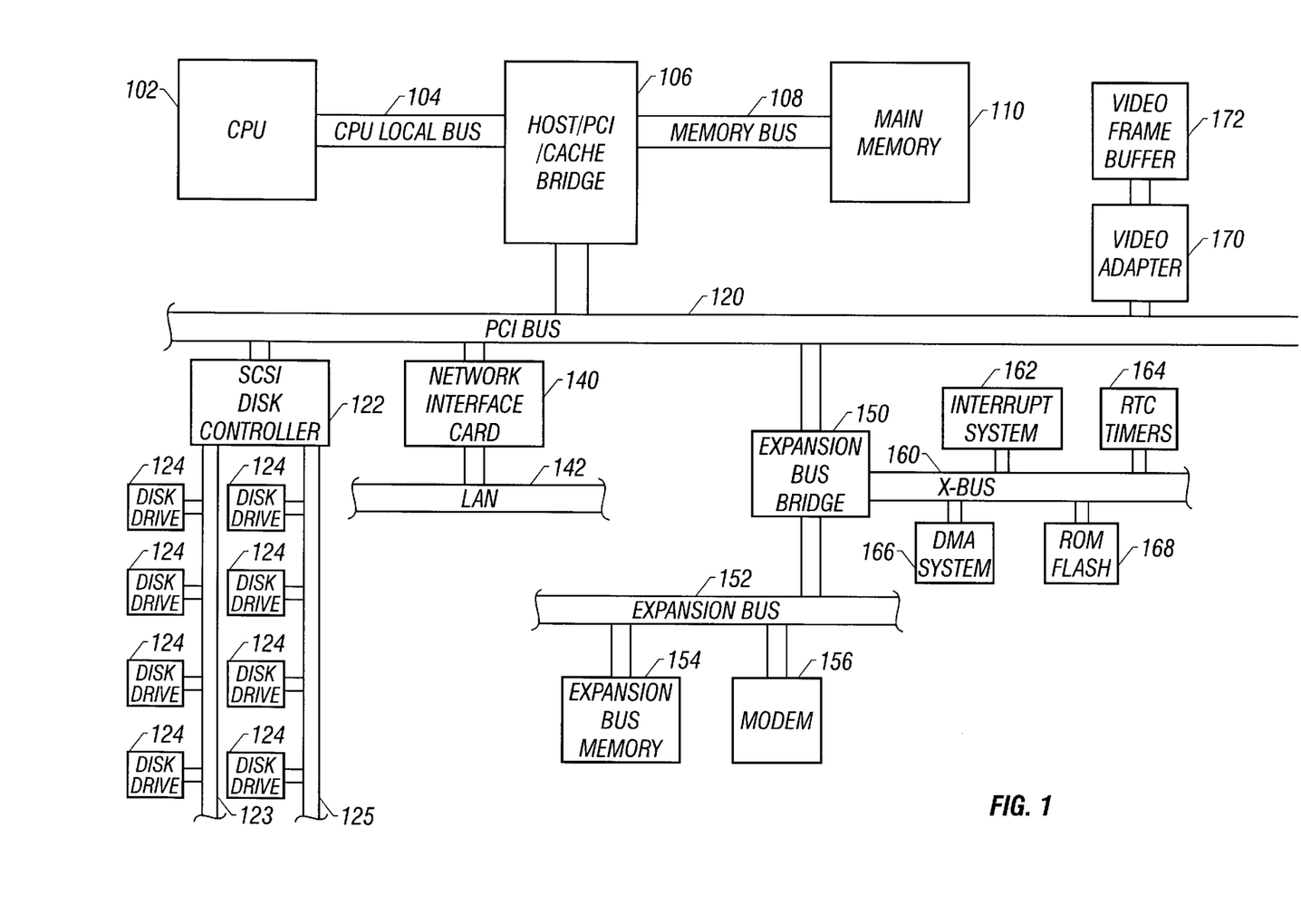
FIG. 1 is a block diagram of a computer system incorporating a disk array system of the present invention.

Referring now to FIG. 1, a block diagram of a computer system incorporating a disk subsystem and layered device driver architecture and including the preferred embodiment of the present invention is shown. The preferred embodiment of the invention is comprised in a disk array subsystem. However, it is noted that the present invention may be incorporated into any of various types of systems which include a layered device driver architecture.

As shown, the computer system includes a central processing unit (CPU) 102 which is coupled through a CPU local bus 104 to a host/PCI/cache bridge 106. The bridge 106 couples through a memory bus 108 to main memory 110. The host/PCI/cache bridge 106 also interfaces to a peripheral component interconnect (PCI) bus 120. In the preferred embodiment, a PCI local bus is used. However, it is noted that other local buses may be used, such as the VESA (Video Electronics Standards Association) VL bus.

Figure 2:
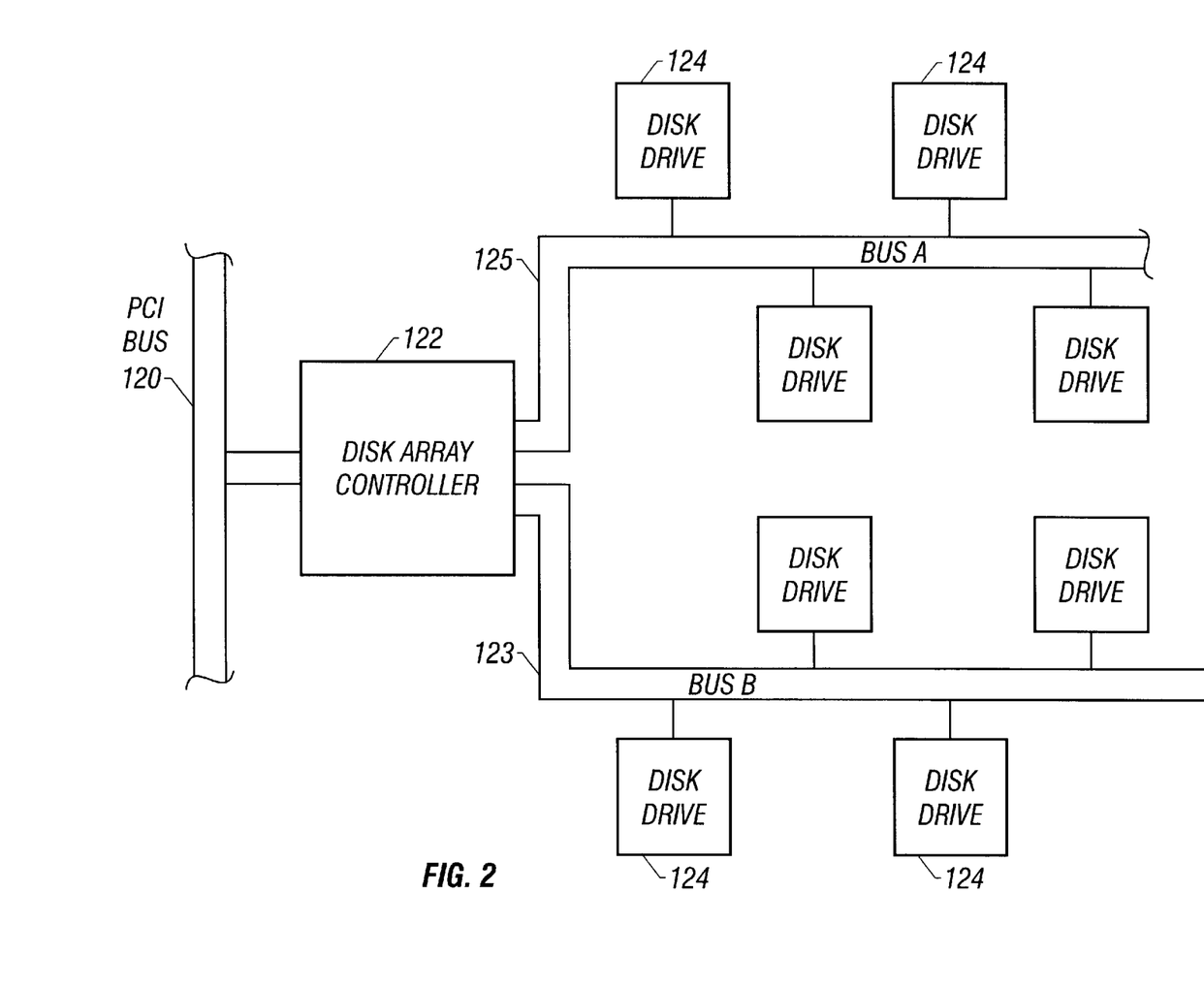
FIG. 2 illustrates the disk array system shown in FIG. 1.

Various types of devices may be connected to the PCI bus 120. In the embodiment shown in FIG. 1, a video adapter 170 and video frame buffer 172 are coupled to the PCI bus 120 for controlling video functions. A SCSI (small computer systems interface) adapter 122 is coupled to the PCI bus 120. In the preferred embodiment, the SCSI adapter 122 is a SCSI disk controller. The SCSI disk controller 122 includes two SCSI channels 123 and 125. Each of these SCSI channels 123 and 125 includes four disk drive units 124 forming a disk array. The disk array system is shown separately in FIG. 2. It is noted that other devices may be connected to the SCSI channels 123 and 125, as desired. Various other devices may be connected to the PCI bus 120, such as a network interface card 140. As shown, the network interface card 140 interfaces to a local area network (LAN) 142.

Expansion bus bridge logic 150 is also preferably coupled to the PCI bus 120. The expansion bus bridge logic 150 interfaces to an expansion bus 152. The expansion bus may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, including expansion bus memory 154 and a modem 156. The expansion bus bridge logic 150 also couples to a peripheral expansion bus referred to as the X-bus 160. The X-bus 160 is used for connecting various peripherals to the computer system. As shown, an interrupt system 162, a real time clock (RTC) and timers 164, a direct memory access (DMA) system 166, and ROM/Flash memory 168 are coupled to the X-bus 160. Other peripherals (not shown) are preferably connected to the X-bus 160, including communications ports, diagnostics ports, command/status registers, non-volatile static random access memory (NVSRAM), etc.

Disk Controller Block Diagram

Figure 3:
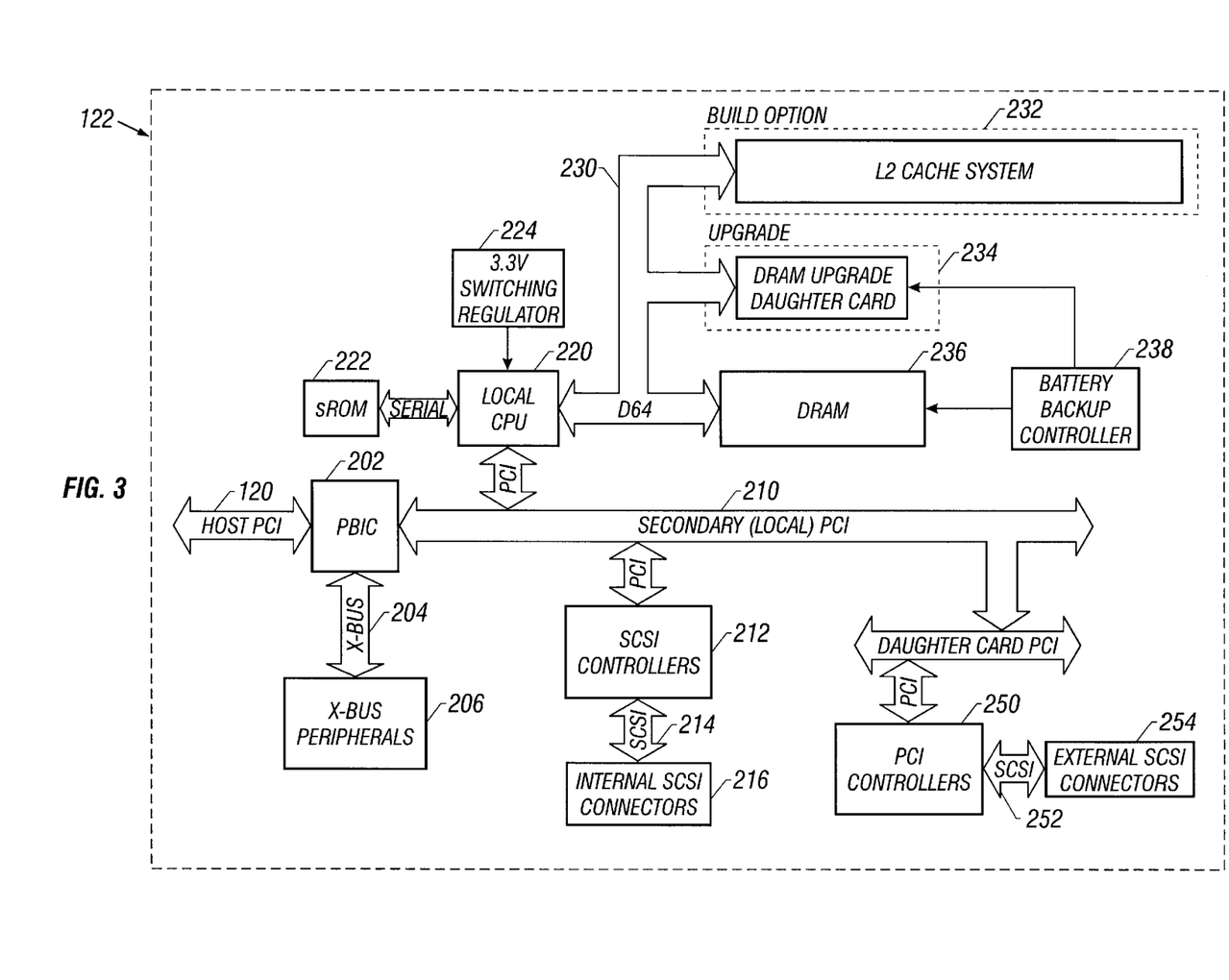
FIG. 3 is a block diagram illustrating the disk controller of FIG. 2.

Referring now to FIG. 3, a block diagram illustrating the SCSI adapter 122 in FIG. 1 is shown. As shown, the SCSI adapter 122 includes a PCI bus interface chip (PBIC) 202, which couples to the host or primary PCI bus 120. The PBIC 202 interfaces through a second X-bus 204 to various X-bus peripherals 206 as shown. The various X-bus peripherals 206 preferably include a DMA system, interrupt system, timers, a real time clock (RTC), configuration ports, diagnostic ports, command/status registers, ROM/Flash memory, and non-volatile SRAM (NVSRAM) (all not shown).

The PBIC 202 also couples to a secondary PCI bus 210. SCSI controllers 212 are coupled to the secondary PCI bus 210. The SCSI controllers 212 in turn couple through a SCSI bus 214 to internal SCSI connectors 216. In the preferred embodiment, two SCSI controllers are incorporated into block 212, and the SCSI bus 214 comprises the two SCSI channels 123 and 125. The internal SCSI connectors 216 are for attaching the various devices, such as the disk drives 124, as shown in FIG. 1.

A local CPU 220 is coupled to the secondary PCI bus 210. The local CPU 220 may be any of various types. In the preferred embodiment, the local CPU 220 is the PowerPC microprocessor produced by Motorola, IBM and Apple. In an alternate embodiment, the local CPU 220 is the Alpha chip from Digital Equipment Corporation (DEC). The local CPU 220 couples through a serial bus to an SROM 222. The local CPU 220 receives power from a 3.3 V switching regulator 224, as shown. The local CPU 220 includes a 64 bit data path which couples through a 64-bit data bus 230. Dynamic random access memory (DRAM) 236 is coupled to the 64-bit data bus 230. The DRAM 236 stores a plurality of layers of drivers, wherein two or more of the layers have a common request structure. The local CPU 220 executes the driver software layers in the DRAM 236 to service host requests, and the local CPU 220 executing these driver layers determines whether requests map unmodified between layers and "quick launches" these requests according to the present invention.

The 64-bit data bus 230 also includes a connection for coupling to an optional dynamic random access memory (DRAM) upgrade daughter card 234. An optional second level or L2 cache system 232 may also be coupled to the 64-bit data bus 230. The DRAM upgrade daughter card 234 and the L2 cache system 232 are shown in dotted lines and are options that are included in the preferred embodiment, but may be left out as desired. A battery backup controller 238 is coupled to each of the DRAM 236 and the DRAM upgrade daughter card 234. The local PCI bus 210 also includes a daughter card option for additional SCSI connections. As shown, additional PCI controllers 250 may be coupled to the local PCI bus 210 through a daughter card PCI bus as shown. The PCI controllers 250 couple through additional SCSI channels 252 to respective external SCSI connectors 254, as shown.

Disk Controller Layered Device Driver Architecture

Figure 4:
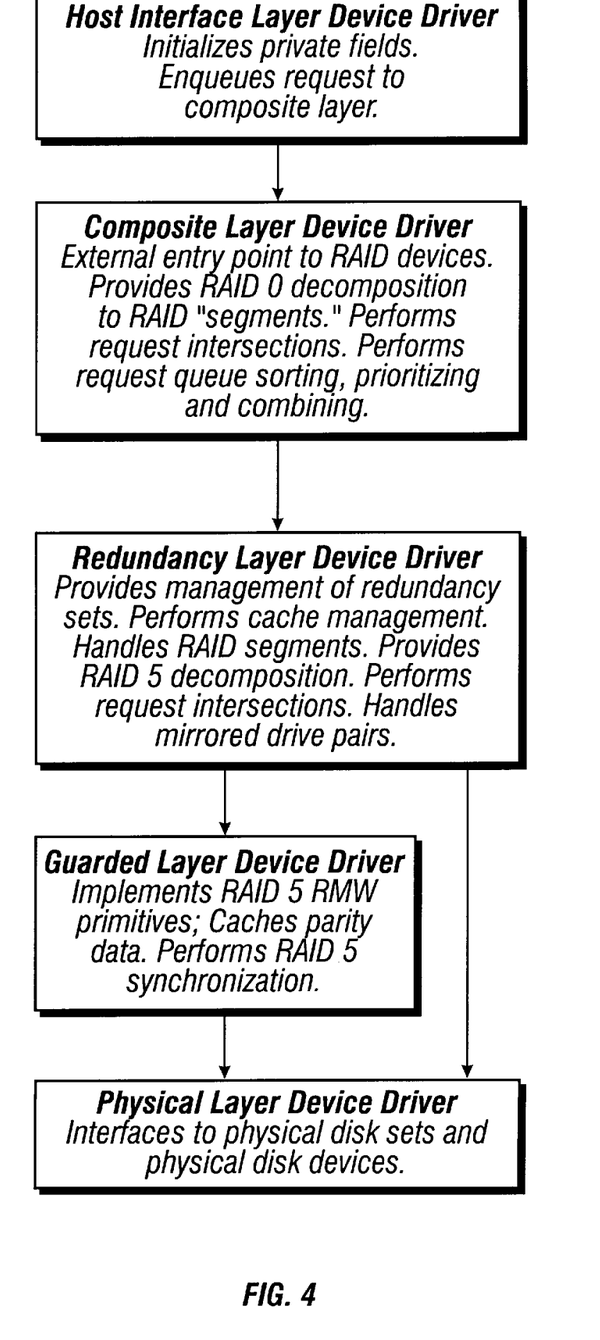
FIG. 4 illustrates a layered device driver architecture of the disk array controller of FIG. 2.

Referring now to FIG. 4, the internal device driver architecture in the disk array controller 122 of the preferred embodiment of the invention is shown. It is noted that the present invention may be used in any system which includes a plurality of layered drivers that execute requests where at least a portion of the requests pass through one or more of the layers unmodified. The driver architecture illustrated in FIG. 4 is an example of a device driver architecture for a disk array system according to the preferred embodiment of the invention.

As shown, the disk array controller 122 includes five levels of device drivers referred to as the host interface layer device driver, the composite layer device driver, the redundancy layer device driver, the guarded layer device driver, and the physical layer device driver. A data request to the disk array system operates as follows. First, software operating on a host such as the host CPU 102 creates a data request and stores the request in the DRAM 236 in the disk array controller 122. In the preferred embodiment, the host processor or host CPU 102 allocates the initial request to shared memory 236 in the disk array controller 122.

The host interface layer device driver initially examines the host request. The host interface layer device driver initializes private fields based on the request and provides handshaking to the host. The host interface layer driver then invokes the composite layer driver.

The composite layer device driver operates as the external entry point to the RAID devices, i.e., the disk drives. The composite layer driver provides RAID 0 decomposition to RAID segments, i.e., the composite layer driver parses the host data request into a number of specific requests for segments in the disk drive array 152 according to a RAID 0 configuration. In other words, the composite layer driver parses the host data request into a number of specific requests for each of the drive sets as if the drive sets were configured in a standard RAID 0 configuration. The composite layer device driver also performs request queue sorting, prioritization, and combining. The composite layer device driver also handles request intersections, i.e., if overlapping write requests to the same drive destination have been received, the composite layer driver ensures that these requests are performed in the order received.

The redundancy layer driver provides management of redundancy sets, which are groups of drives that provide a core level of data redundancy. The redundancy layer driver also performs cache management, provides RAID 5 decomposition, handles mirrored drive pairs, and handles RAID segments. Further request intersection operations may also be performed here, as desired.

The guarded layer device driver implements RAID 5 read-modify-write (RMW) primitives and caches parity data. The guarded layer also performs RAID 5 synchronization operations. It is noted that, depending on the request, the redundancy layer device driver either directly invokes the guarded layer device driver or bypasses the guarded layer device driver and directly invokes the physical layer device driver.

The physical disk driver directly interfaces with the physical disk sets and operates to transfer data to and from the physical disks, as is well known in the art. The primary purpose of the physical disk driver is to interface to the physical disk devices, i.e., perform the necessary functions to physically access each of the disk drives.

In the preferred embodiment, all layers except the physical layer share a common request structure. Thus, when a request maps unmodified between layers, the disk controller can dequeue the request and enqueue the request on the next lower level queue with minimal or no request translations required between the layers.

Since further information regarding the operations of the above device driver layers are not necessary for an understanding of the operation of the present invention, details of these features are omitted for simplicity.

Simplified Layered Device Driver Architecture

Figure 5:
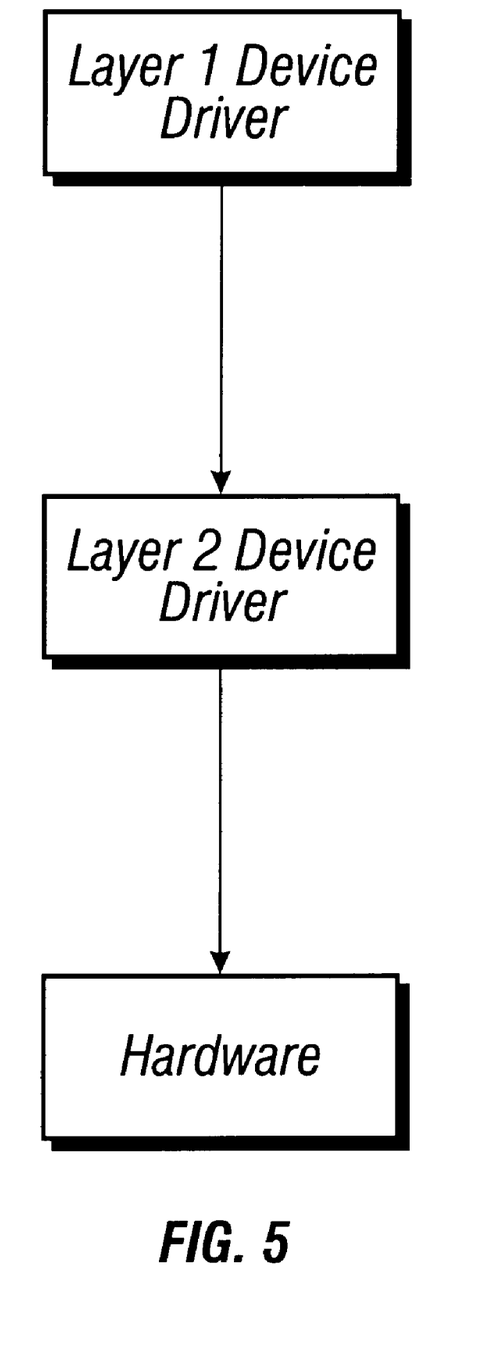
FIG. 5 illustrates a simplified example of a layered device driver architecture.

Referring now to FIG. 5, a simplified example of a layered device driver architecture is shown. As shown, a simple layered device driver architecture includes a Layer 1 device driver which interfaces to a Layer 2 device driver which in turn interfaces to hardware. According to the present invention, each layer includes a common request structure. This simplified example of a layered device driver architecture is used to describe the request flow through a layered device driver architecture according to prior art methods (FIG. 6) and to describe the request flow through a layered device driver architecture according to the present invention (FIG. 7).

Request Flow Through a Layered Device Driver System—Prior Art

Figure 6:
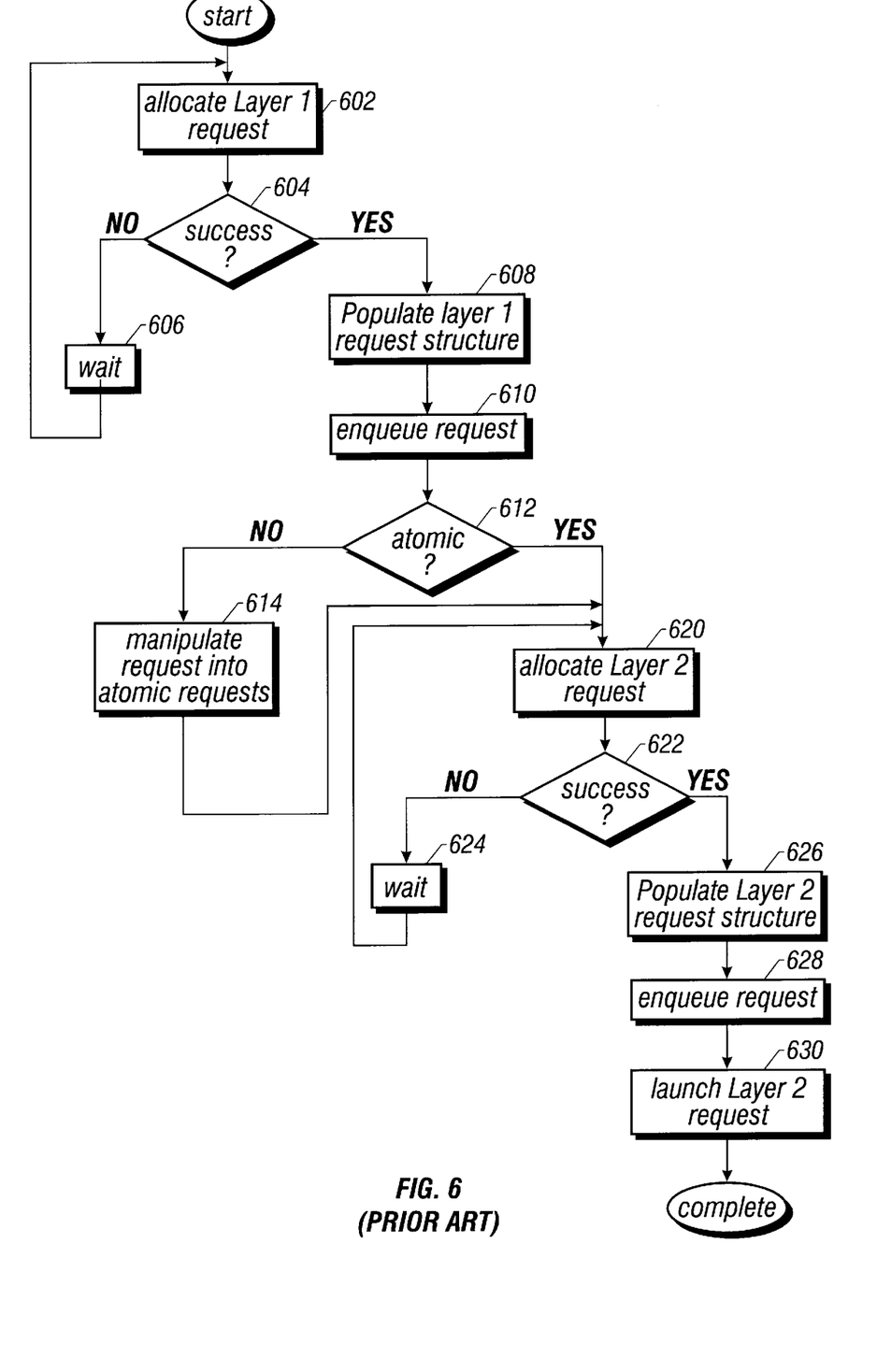
FIG. 6 is a flowchart diagram illustrating operation of disk requests through a normal layered device driver architecture according to the prior art.
Figure 7:
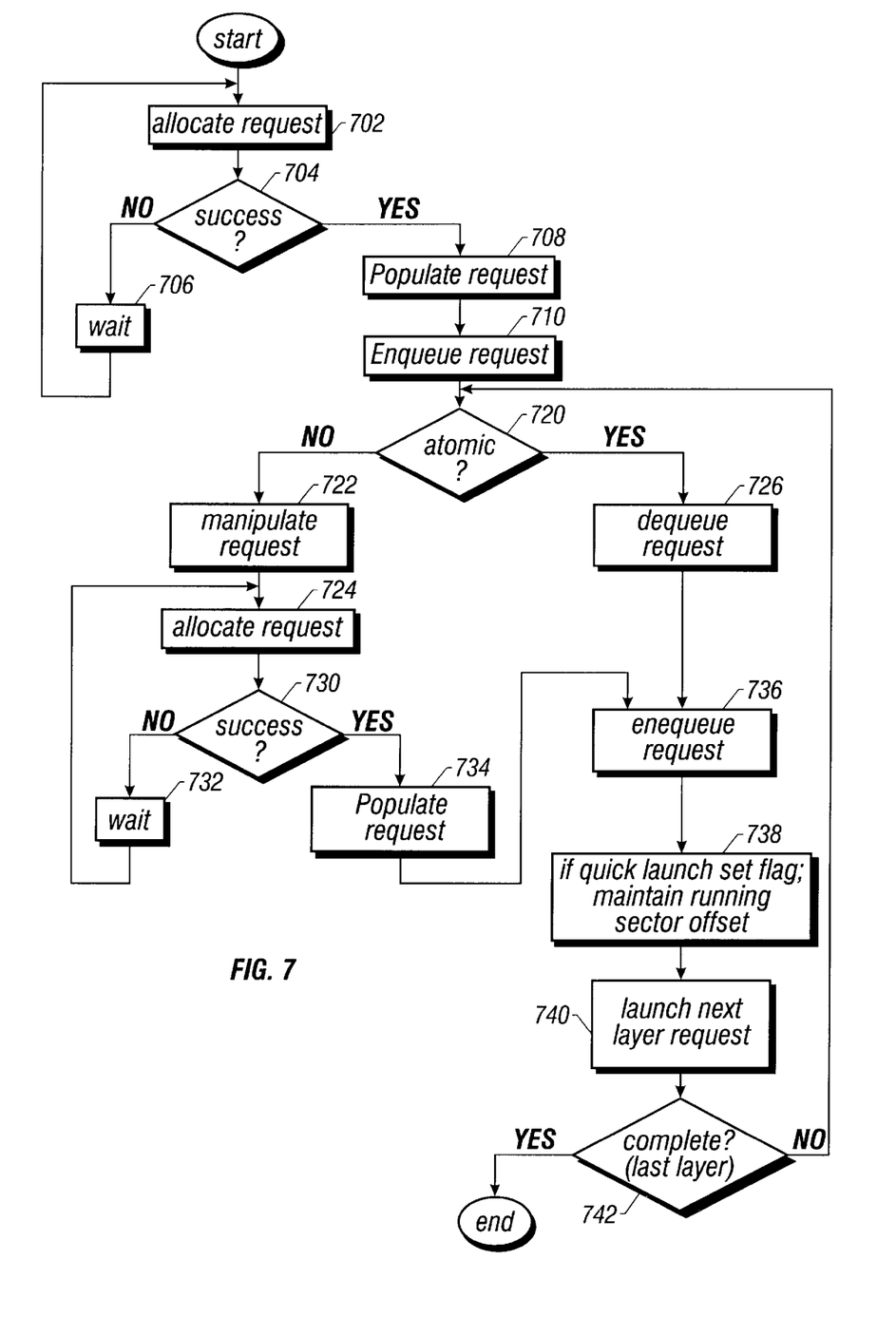
FIG. 7 is a flowchart diagram illustrating operation of disk requests through a layered device driver architecture according to the present invention.

Referring now to FIG. 6, a flowchart diagram is shown illustrating the request flow through the layered device driver system of FIG. 5 according to the prior art. When the host request is received, then in step 602 the disk controller allocates a layer 1 request to invoke the layer 1 device driver. Allocating the layer 1 request involves obtaining the request from a pool of free requests. In step 604 the disk controller determines if allocation of this layer 1 device driver has completed successfully. If not, then the disk controller waits a period of time in step 606 and then reallocates the request. If the layer 1 device driver is determined to have been allocated successfully in step 604, then in step 608 the disk controller populates the layer 1 request structure. In step 610 the disk controller enqueues the request on a queue associated with the layer 1 driver.

In step 612 the disk controller, executing the layer 1 driver, determines if this request is an atomic request, i.e., the disk controller determines if this request comprises a single disk operation. If not, then in step 614 the disk controller manipulates the request into a plurality of atomic requests and advances to step 620. If the disk controller determines that the enqueued request is atomic in step 612, then the system advances directly to step 620.

In step 620 the disk controller executing the layer 1 driver allocates a layer 2 request for the layer 2 device driver. In step 622 the disk controller determines if the layer 2 request has been properly allocated. If not, then in step 624 the disk controller waits a period of time and then reallocates the request. If the disk controller determines in step 622 that the layer 2 request has been properly allocated, then in step 626 the disk controller populates the layer 2 request structure. In step 628 the disk controller enqueues the request on the layer 2 queue, and in step 630 the disk controller launches the layer 2 request.

When the layer 1 device driver creates the layer 2 request structure and passes this request structure to the next lower level, i.e., enqueues the layer 2 request structure on the layer 2 queue, the layer 1 driver executing on the disk controller creates and maintains a copy of this request structure. The layer 1 device driver maintains a copy of the request structure for the duration of the disk I/O operation and releases the request structure to its requester, in this case the host CPU, when the request is completed. The above process repeats for each device driver layer in the system.

Therefore, each driver layer is required to allocate and populate a new request structure for the next lowest level driver. In addition, for each device driver layer in the system, the respective driver creates a duplicate request structure for the next lowest layer device driver while maintaining a copy of the request structure. Each request structure typically requires between 300 and 600 bytes of information, and thus the duplicate request structures for each driver layer consumes considerable memory.

When the final device driver layer completes execution of the request, this driver layer performs a completion callback routine to inform its calling driver layer, i.e., the next highest layer, that operations have completed. Likewise each driver layer performs a completion callback on its calling driver layer or next highest layer. This requirement that each driver layer perform a completion callback to its next highest calling layer adds additional latency to the request.

Request Flow Through a Layered System—Present Invention

Referring now to FIG. 7, a flowchart diagram is shown illustrating operation of the disk array controller 122 executing the various layers of device drivers in a layered device driver system according to the present invention. This method assumes either the system of FIG. 5 with two device driver layers, referred to as layer 1 and layer 2, or the system of FIG. 4 with five layers of drivers. It is noted that the present invention may be generalized to any number of device driver layers.

When the host request is received, then in step 702 the disk controller 122 allocates a layer 1 request. In step 704 the disk controller 122 determines if this allocation has completed successfully. If not, then the disk controller 122 waits a period of time in step 706 and then reallocates the request. If the allocation is determined to have completed successfully in step 704, then in step 708 the disk controller 122 populates the layer 1 request structure. Populating the request comprises filling out the request structure with appropriate data and commands. In step 710 the disk controller 122 enqueues the request on the layer 1 queue.

In step 720 the disk controller 122, executing the layer 1 driver, determines if this request is an atomic request, i.e., the disk controller 122 determines if this request maps unmodified to the next lowest layer device driver. In the preferred embodiment, this determination comprises determining if the request involves a single disk operation. If the disk controller 122 determines that the enqueued request is atomic in step 720, then in step 726 the disk controller 122 dequeues the request from the respective driver layer queue and operation proceeds directly to step 736. In step 736, the disk controller 122 enqueues the request on the next lowest layer queue and in step 740 the disk controller 122 launches the next layer request. As shown in FIG. 7, in step 738 the disk controller 122 also preferably sets a flag to indicate that the request was quick launched and maintains a running sector offset, as described below.

If the request does not map unmodified to the next lowest layer driver, then in step 722 the disk controller 122 executing the respective driver layer manipulates the request into one or more atomic requests and in step 724 allocates these one or more requests for the next lowest layer. In step 730 the disk controller 122 determines if the request has been properly allocated. If not, then in step 732 the disk controller 122 waits a period of time and then reallocates the request. If the disk controller 122 determines in step 730 that the requests have been properly allocated, then in step 734 the disk controller 122 populates the one or more requests. The disk controller 122 then advances to step 736. In step 736, the disk controller 122 enqueues the request(s) on the next lowest layer queue and in step 740 the disk controller launches the next layer request. It is noted that step 738 is not performed in this instance since the request was not quick launched. If the request launched in step 740 is the last driver layer in step 742, then this last driver layer completes the host request and retrieves the desired data, and operation completes.

As shown in FIG. 7, if the device driver layer which begins operations or is launched in step 740 is not the last driver layer, then this driver layer also performs steps 720–738. In other words, the device driver layer which begins operations in step 740 first determines if the request if atomic, i.e., if the request maps unmodified to the next lowest layer driver, and, if so, quick launches the request to the next lowest layer. This operation is preferably performed for each device driver layer sharing the common request structure.

Therefore, if a request is determined to map unmodified to the next lowest layer device driver in step 720, the request is dequeued from the respective driver level queue and immediately enqueued on the queue of the next lower level driver, and this driver layer immediately begins operation. Thus steps 722–734 are avoided. This operation of bypassing one or more of steps 722–734 is referred to as a "quick launch". The quick launch method of the present invention eliminates unnecessary operations and also eliminates the need for a driver to pass a duplicate of the request to the next lowest driver layer while also maintaining a copy of the request. This results in memory savings in the disk controller 122.

Completion Callbacks

When the final device driver layer completes execution of the request, this driver layer performs a completion callback routine to inform its calling driver layer that operations have completed. Likewise, as shown in step 802 of FIG. 8, each driver layer performs a completion callback on its calling driver layer. The completion callback function notifies the higher level calling layer of completion of the I/O and transfers ownership of the request from the lower level layer back to the higher level calling layer.

When a first layer device driver allocates a lower layer request and populates or creates a request structure, the lower layer request structure includes a field comprising a pointer to the callback function. As described below, when the request structure is completed by a respective lower level driver layer, the respective completing driver layer invokes the callback function pointed to by the pointer field in its respective request structure to notify the higher level calling driver layer of completion of the I/O.

Where the request has been "quick launched" one or more times according to the present invention and steps 722–734 have been avoided for one or more intermediate driver layers, completion callback functions are not performed by or to these layers, thus bypassing these intermediate layers. Rather, the completion callback is performed directly to the higher level calling layer which allocated and populated the request. Thus, for example, if a first driver layer quick launched past driver layers 2 and 3 directly to driver layer 4, and driver layer 4 is the final driver layer to execute, driver layer 4 executes a completion callback function directly to driver layer 1, bypassing driver layers 2 and 3. The elimination of unnecessary completion callbacks greatly improves system performance.

Figure 8:
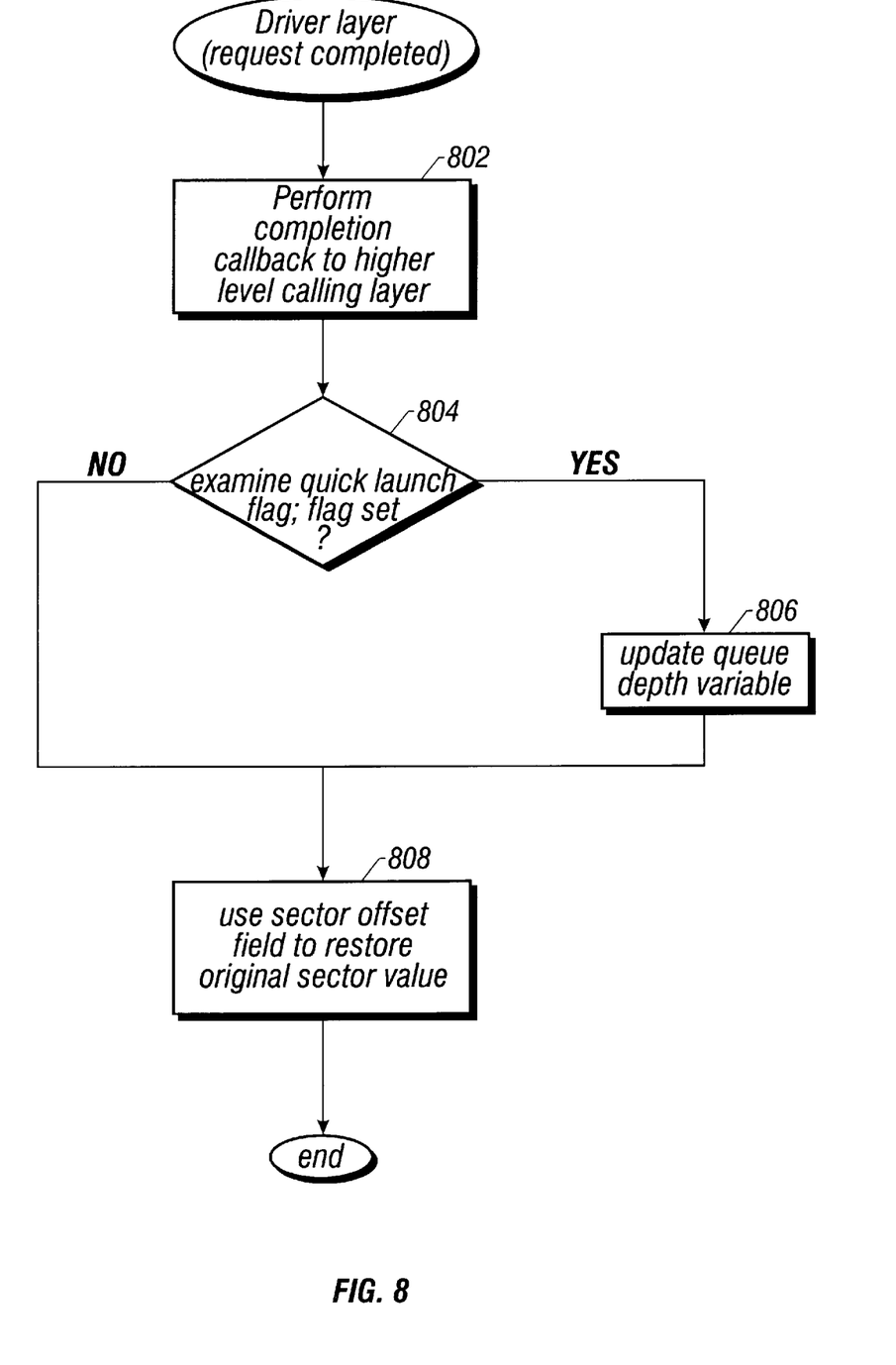
FIG. 8 is a flowchart diagram illustrating a completion callback performed by a driver layer.

As mentioned above, according to the preferred embodiment, the disk controller 122 sets a flag when a quick launch is performed. As shown in FIG. 8, during the completion callback, the callback function for each layer examines its respective flag in step 804 and updates a queue depth variable in step 806 if a quick launch was performed. Various other operations may be performed in the completion callback if the request was quick launched, as desired.

Also, in the preferred embodiment starting sector numbers of the disk requests are presumed to change as the request propagates through the various software layers. Therefore, the preferred embodiment of the invention includes a mechanism for correcting the starting sector number and error sector numbers using the callback function. This method includes using a sector offset, which is initially set to zero. When a quick launch is performed according to the present invention and the sector is translated, the sector displacement is added to the running offset field. Upon completion of each of the device driver layers, during execution of the callback function in step 808, the offset field is subtracted from the starting and error sector numbers to restore the original value.

Example Request Execution

In the preferred embodiment including the driver layers of FIG. 4, all layers except the physical layer share a common request structure. An example of execution of a request using the quick launch method of the present invention in the embodiment of FIG. 4 is described below. First, the host processor 102 allocates the initial request from shared memory in the disk controller 122. The host interface layer initializes various private fields and enqueues the request directly to the composite layer. The composite layer provides RAID 0 functions and request sorting, prioritizing, and combining. The composite layer determines that the request maps unmodified to the redundancy layer and quick launches the request to the redundancy layer. The redundancy layer provides management of redundancy sets, which are groups of drives which provide the core level of data redundancy. In the preferred embodiment, no additional quick launches are performed.

In the embodiment of FIG. 4 described above, the present invention eliminates request allocation, and its potential task blocking code, and one layer of completion callbacks. The present invention also reduces the size of the internal request pool from about 1000 requests to about 100 requests in the above example. Since request structures require about 300 bytes of memory, this results in a saving of about 256 Kbytes of otherwise wasted memory.

The following page comprises source code of the preferred embodiment of the invention.

```
quick launch code:
** If, for any reason, the command cannot be quick-launched, then
** the code that determines that will set CANNOT_QUICK_FLAG
    in the
** command field. All we have to do here is check that flag...
*/
if ((request->command & CANNOT_QUICK_FLAG) == 0)
{
```

```
*/
** Set the new device number and adjust the starting sector value.
** Remember the starting offset so that a fixup can be performed,
** and set a flag indicating that the fixup is needed.
request->oldDeviceNumber = request->deviceNumber;
request->deviceNumber = newDeviceNumber;
request->startOffset = newStartsector - request->startSector;
request->startSector = newStartSector;
request->command |= QUICK_FLAG;
*/
** Remove the request from its current queue and pass it on.
*/
DEQUEUE(request);
begin(request);
}
upon completion:
*/
** if the command was quick-launched
*/
if (request->command & CANNOT_QUICK_FLAG)
{
    */
    ** Fixup the startSector value and the errorSector.
    ** Maintain the original device queue depth.
    */
    request->errorSector -= request->startOffset;
    request->startSector -= request->startOffset;
    devinfo[request->oldDeviceNumber].queueDepth--;
}
(*(request>callback))(request);
```

Conclusion

Therefore, as mentioned above, the disk controller of the present invention includes a layered device driver architecture that performs one or more RAID methods. In an independent access RAID implementation, any individual disk request generally involves only one physical disk. As a result, the vast majority of requests processed by the disk controller of the present invention can be "quick launched" according to the present invention. Therefore, the system and method of the present invention reduces and/or virtually eliminates added latency in layered device driver architectures for those requests which pass through one or more device driver layers unmodified. The present invention reduces command latency and memory requirements in operating systems and embedded applications.

For example, if a read request only requires data from one drive in the array, then it is only necessary to determine which drive will satisfy the request, and it is unnecessary to create duplicate request structures for each layer. The system and method of the present invention determines if each respective request maps one to one with a request in the next lower layer. Any request which is atomic, i.e., maps one to one with a request in the next lower layer, is dequeued and launched directly onto the next lower layer. Thus it is no longer necessary to create a duplicate request structure for each layer. The system and method further includes a callback method at the end of the process, whereby the lowest layer device driver handling the request invokes the callback function to its calling layer to perform completion operations, wherein the callback function bypasses intermediate driver layers where quick launches have taken place.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for reducing latency in a disk system comprising a disk array including a plurality of disk drives and a disk controller coupled to the disk array, wherein the disk system includes a layered device driver architecture comprising a plurality of layers of drivers, and wherein the disk controller executes the plurality of layers of drivers to access data on said disk drives, the method comprising:

receiving a request for data on one or more of said plurality of disk drives;

allocating a request associated with said request for data, said request being obtained from a plurality of free requests;

placing said request on a first request queue associated with a first driver layer, wherein said first driver layer executing in said disk controller initially examines said request;

determining if said request maps unmodified from said first driver layer to a lower driver layer;

quick launching said request on said lower driver layer after said determining if is said request maps unmodified from said first driver layer to said lower driver layer, wherein said quick launching comprises:
    dequeueing said request from said first request queue of said first driver layer; and
    enqueueing said request on a queue of said lower driver layer after said dequeueing without allocating an additional request;

beginning execution of said lower driver layer after said quick launching if said request maps unmodified from said first driver layer to said lower driver layer; and performing said determining, quick launching, and beginning execution for a plurality of said plurality of driver layers.

2. The method of claim 1, wherein each of said plurality of said plurality of driver layers includes a common request structure.

3. The method of claim 1, further comprising:
said plurality of driver layers completing operations; and
one or more of said driver layers performing a completion callback directly to its calling driver layer to notify said calling layer of completion of said request; wherein said completion callback bypasses driver layers which begin execution in response to said quick launching.

4. The method of claim 3, wherein one or more starting sector numbers change in response to each of said quick launching;
wherein each of said quick launching includes maintaining a sector offset; and
wherein each of said performing said completion callback comprises compensating for said sector offset.

5. The method of claim 3, wherein each of said quick launching includes setting a quick launch flag;
wherein each of said performing said completion callback comprises:
    examining said quick launch flag; and
    updating a queue depth variable if said quick launch flag is set.

6. The method of claim 1, further comprising:
manipulating said request into one or more requests after said determining if said request does not map unmodified to said lower driver layer;
allocating said one or more requests for said lower driver layer after said manipulating if said request does not map unmodified to said lower driver layer;

populating said one or more requests with commands and data after said allocating if said request does not map unmodified to said lower driver layer;

enqueueing said one or more requests on said queue of said lower driver layer after said populating;

beginning execution of said lower driver layer after said manipulating said request, allocating said one or more requests, populating said one or more requests, and enqueueing said one or more requests on said queue of said lower driver layer.

7. A method for reducing latency in a disk system comprising a disk array including a plurality of disk drives and a disk controller coupled to the disk array, wherein the disk system includes a layered device driver architecture comprising a plurality of layers of drivers, and wherein the disk controller executes the plurality of layers of drivers to access data on said disk drives, the method comprising the steps of:

receiving a request for data on one or more of said plurality of disk drives;

allocating a request associated with said request for data, said request being obtained from a plurality of free requests;

placing said request on a first request queue associated with a first driver layer, wherein said first driver layer executing in said disk controller initially examines said request;

determining if said request maps unmodified from said first driver layer to a second driver layer;

quick launching said request on said second driver layer after said determining if said request maps unmodified from said first driver layer to said lower driver layer, wherein said quick launching comprises:
  dequeueing said request from said first request queue of said first driver layer; and
  enqueueing said request on a second queue of said second driver layer after said dequeueing without allocating an additional request; and beginning execution of said second driver layer after said quick launching said request on said second driver layer.

8. The method of claim 7, wherein said first and second layers include a common request structure.

9. The method of claim 7, further comprising:

determining if said request maps unmodified from said second driver layer to a third driver layer after said beginning execution of said second driver layer; and quick launching said request on said third driver layer if said request maps unmodified from said second driver layer to said third driver layer, wherein said quick launching comprises:
  dequeueing said request from said second queue of said second driver layer; and
  enqueueing said request on a third queue of said third driver layer after said dequeueing; and beginning execution of said third driver layer after said quick launching said request on said third driver layer.

10. The method of claim 9, further comprising:

said third driver layer performing operations on said request after said beginning execution of said third driver layer; and said third driver layer performing a completion callback directly to said first driver layer to notify said first driver layer of completion of said request after said performing operations.

11. The method of claim 9, further comprising:

determining if said request maps unmodified from said third driver layer to a fourth driver layer after said beginning execution of said third driver layer; and quick launching said request on said fourth driver layer if said request maps unmodified from said third driver layer to said fourth driver layer, wherein said quick launching comprises:
  dequeueing said request from said third request queue of said third driver layer; and
  enqueueing said request on a fourth queue of said fourth driver layer after said dequeueing; and beginning execution of said fourth driver layer after said quick launching said request on said fourth driver layer.

12. The method of claim 11, further comprising:

said fourth driver layer performing operations on said request after said beginning execution of said fourth driver layer; and said fourth driver layer performing a completion callback directly to said first driver layer to notify said first driver layer of completion of said request after said performing operations.

13. The method of claim 12, wherein each of said plurality of driver layers 2 includes a common request structure.

14. The method of claim 7, further comprising:

manipulating said request into one or more requests after said determining if said request does not map unmodified to said second driver layer;

allocating said one or more requests for said second driver layer after said manipulating if said request does not map unmodified to said second driver layer;

populating said one or more requests with commands and data after said allocating if said request does not map unmodified to said second driver layer;

enqueueing said one or more requests on said second queue of said second driver layer after said populating; and beginning execution of said second driver layer after said manipulating said request, said allocating said one or more requests, said populating said one or more requests, and said enqueueing said one or more requests on said second queue of said second driver layer.

15. A method for reducing latency in a system including a layered device driver architecture comprising a plurality of layers of drivers, wherein a processor executes the plurality of layers of drivers to perform operations, the method comprising the steps of:

receiving a request for data which requires execution of said plurality of layers of drivers;

allocating a request associated with said request for data, said request being obtained from a plurality of free requests;

placing said request on a first request queue associated with a first driver layer, wherein said first driver layer executing on said processor initially examines said request;

determining if said request maps unmodified from said first driver layer to a lower driver layer;

quick launching said request on said lower driver layer after said determining if said request maps unmodified from said first driver layer to said lower driver layer, wherein said quick launching comprises:
  dequeueing said request from said first request queue of said first driver layer; and enqueueing said request on a queue of said lower driver layer after said dequeueing and without allocating an additional request;

beginning execution of said lower driver layer after said quick launching if said request maps unmodified from said first driver layer to said lower driver layer; and performing said determining, quick launching, and beginning execution for a plurality of said plurality of driver layers.

16. The method of claim 15, wherein each of said plurality of driver layers includes a common request structure.

17. The method of claim 15, further comprising:

said plurality of driver layers completing operations; and one or more of said driver layers performing a completion callback directly to its calling driver layer to notify said calling layer of completion of said request; wherein said completion callback bypasses driver layers which begin execution in response to said quick launching.

18. The method of claim 17, wherein each of said quick launching includes setting a quick launch flag;

wherein each of said performing said completion callback comprises:

examining said quick launch flag; and updating a queue depth variable if said quick launch flag is set.

19. The method of claim 15, further comprising:

manipulating said request into one or more requests after said determining if said request does not map unmodified to said lower driver layer;

allocating said one or more requests for said lower driver layer after said manipulating if said request does not map unmodified to said lower driver layer;

populating said one or more requests after said allocating if said request does not map unmodified to said lower driver layer;

enqueueing said one or more requests on said queue of said lower driver layer after said populating;

beginning execution of said lower driver layer after said manipulating said request, said allocating said one or more requests, said populating said one or more requests, and said enqueueing said one or more requests on said queue of said lower driver layer.

20. A computer system comprising:

a processor;

a memory coupled to the processor;

at least one device coupled to the processor;

a device driver including a plurality of device driver layers, the device driver layers being executable by the processor;

an allocation routine executable on the processor, the allocation routine allocating a request associated with a request for data, the request being obtained from a plurality of free requests;

a determination routine executable on the processor, the determination routine determining if the request to the at least one device maps unmodified from a first driver layer of the plurality of device driver layers to a second driver layer of the plurality of device driver layers; and a quick launch routine executable on the processor, the quick launch routine transferring the request from the first driver layer of the plurality of device driver layers to the second driver layer of the plurality of device driver layers if the determination routine determines that the request maps unmodified from the first driver layer of the plurality of device driver layers to the second driver layer of the plurality of device driver layers, wherein the quick launch routine transfers the request without allocating an additional request.

21. The computer system of claim 20 wherein each of the plurality of device driver layers includes a determination routine.

22. The computer system of claim 20 wherein the at least one device is a disk drive.

23. The computer system of claim 20 wherein each of the plurality of device driver layers includes a queue, and wherein the quick launch routine includes:

a dequeueing routine capable of removing the request from the queue of the first driver layer; and an enqueueing routine capable of placing the request in the queue of the second device driver layer.

24. The computer system of claim 20 wherein at least one of the device driver layers includes a request allocation routine executable on the processor and operable to allocate a first request structure in the memory, the first request structure for storing at least one of request data and a command associated with the request.

25. The computer system of claim 20 wherein the second device driver layer includes a completion callback routine executable on the processor to notify the first device driver layer that execution of the request for data is complete.

26. The computer system of claim 20 wherein a request that maps unmodified from one layer to another layer is a single disk operation request.

27. A device driver comprising:

a plurality of device driver layers each capable of receiving a request for data, wherein at least a first and a second device driver layer of the plurality of layers each has an associated queue capable of storing the received request for data;

the first device driver layer including:

a request allocation routine operable to allocate a first request structure in a memory, the first request structure for storing at least one of request data and a command associated with the request;

a quick launching routine operable to dequeue the request from the queue associated with the first device driver layer and to enqueue the request in the queue associated with the second device driver layer without allocating an additional request structure; and a request type determination routine operable to analyze the request, the request type determination routine selectively activating the request allocation routine when the request maps modified from the first device driver layer to the second device driver layer, and selectively activating the quick launching routine when the request maps unmodified from the first device driver layer to the second device driver layer.

28. The device driver of claim 27 encoded in a computer readable medium as software executable on a processor.

29. The device driver of claim 28 wherein the processor is coupled into a disk controller including a memory coupled to the processor and a communications bus coupled to the processor.

30. The device driver of claim 28 wherein the processor is coupled into a computer system including a memory coupled to the processor, a communications bus coupled to the processor, and a disk drive coupled to the communications bus.

31. The device driver of claim 27 wherein the second device driver layer includes a request allocation routine operable to allocate a second request structure in the memory.

32. The device driver of claim 31 wherein the first request structure and the second request structure comprise a common request structure.

33. The device driver of claim 27 further comprising:

a final device driver layer including a completion callback routine to notify a layer that called the final device driver layer that execution of the request for data is complete.

34. The device driver of claim 27 wherein a request that maps unmodified from one layer to another layer is a single disk operation request.

35. A device driver comprising:

a plurality of device driver layers, the device driver layers being executable on a processor and being capable of receiving a request for data;

an allocation means for allocating a request associated with the request for data, the request being obtained from a plurality of free requests;

a determination means for determining if the request maps unmodified from a first device driver layer of the plurality of device driver layers to a second device driver layer of the plurality of device driver layers; and a quick launch means for transferring the request from the first driver layer of the plurality of device driver layers to the second driver layer of the plurality of device driver layers if the determination means determines that the request maps unmodified from the first device driver layer of the plurality of device driver layers to the second device driver layer of the plurality of device driver layers, wherein the quick launch means transfers the request without allocating an additional request.

* * * * *